United States Patent
Gormley

(10) Patent No.: US 10,724,474 B2
(45) Date of Patent: Jul. 28, 2020

(54) HYBRID ARTICULATING/TRANSLATING TRAILING EDGE REVERSER

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 282 days.

(21) Appl. No.: 15/968,426

(22) Filed: May 1, 2018

(65) Prior Publication Data

US 2019/0338727 A1    Nov. 7, 2019

(51) Int. Cl.
*F02K 1/60* (2006.01)
*F02K 1/76* (2006.01)

(52) U.S. Cl.
CPC .............. *F02K 1/605* (2013.01); *F02K 1/763* (2013.01); *F05D 2220/323* (2013.01); *F05D 2230/60* (2013.01); *F05D 2240/12* (2013.01); *F05D 2250/34* (2013.01); *F05D 2250/35* (2013.01)

(58) Field of Classification Search
CPC ... F02K 1/60; F02K 1/605; F02K 1/62; F02K 1/625; F02K 1/70; F02K 1/72
See application file for complete search history.

(56) References Cited

U.S. PATENT DOCUMENTS

| | | | |
|---|---|---|---|
| 2,976,681 A * | 3/1961 | Pearson | F02K 1/48 239/265.29 |
| 4,147,027 A | 4/1979 | Greathouse | |
| 4,212,442 A | 7/1980 | Fage | |
| 4,382,551 A | 5/1983 | Thayer | |
| 4,410,152 A | 10/1983 | Kennedy et al. | |
| 4,422,605 A | 12/1983 | Fage | |
| 5,181,676 A | 1/1993 | Lair | |
| 5,794,433 A | 8/1998 | Peters et al. | |
| 6,170,255 B1 * | 1/2001 | Gonidec | F02K 1/70 60/226.2 |
| 6,311,928 B1 | 11/2001 | Presz, Jr. et al. | |
| 6,487,845 B1 * | 12/2002 | Modglin | F02K 1/60 239/265.29 |
| 8,002,217 B2 | 8/2011 | Sternberger | |
| 8,051,639 B2 | 11/2011 | Lair | |

(Continued)

FOREIGN PATENT DOCUMENTS

| EP | 763653 | 3/1997 |
|---|---|---|
| EP | 1903205 | 3/2008 |

(Continued)

OTHER PUBLICATIONS

European Patent Office, European Search Report dated Oct. 1, 2019 in Application No. 19172094.5.

*Primary Examiner* — Andrew H Nguyen
(74) *Attorney, Agent, or Firm* — Snell & Wilmer, L.L.P.

(57) ABSTRACT

A thrust reverser for a gas turbine engine may comprise a frame, a first reverser door pivotally mounted to the frame at a first pivot point, a second reverser door pivotally mounted to the frame at a second pivot point, a first nacelle defining a first trailing edge of the gas turbine engine coupled between the frame and the first reverser door, and a second nacelle defining a second trailing edge of the gas turbine engine coupled between the frame and the second reverser door. The first nacelle and the second nacelle translate in an aft and radial outward direction relative to the gas turbine engine in response to the thrust reverser moving to a deployed position.

18 Claims, 6 Drawing Sheets

(56) References Cited

U.S. PATENT DOCUMENTS

| | | |
|---|---|---|
| 8,091,827 B2 | 1/2012 | Lair |
| 8,172,175 B2 | 5/2012 | Lair |
| 9,447,749 B2 | 9/2016 | James |
| 9,783,315 B2 | 10/2017 | James |
| 2003/0218094 A1 | 11/2003 | Lair |
| 2007/0267539 A1 | 11/2007 | Bulin |
| 2008/0083210 A1 | 4/2008 | Sternberger et al. |
| 2014/0239084 A1 | 8/2014 | Chandler et al. |
| 2015/0267642 A1 | 9/2015 | Gormley |
| 2016/0201604 A1* | 7/2016 | Gormley .................. F02K 1/76 415/144 |

FOREIGN PATENT DOCUMENTS

| | | |
|---|---|---|
| GB | 2252279 | 8/1992 |
| WO | 2011014250 | 2/2011 |

\* cited by examiner

HYBRID ARTICULATING/TRANSLATING TRAILING EDGE REVERSER

FIELD

The present disclosure relates generally to aircraft thrust reversers used with gas turbine engines and, more particularly, to pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing. Pivot door thrust reversers may be used with turbofan gas turbine engines for aircraft, including for corporate or business jets. Pre-exit pivot door thrust reversers may generally be characterized as including thrust reverser doors having trailing edges positioned forward of the exit plane of an exhaust duct, while post-exit pivot door thrust reversers may generally be characterized as including thrust reverser doors having trailing edges that form at least a portion of the exit plane of an exhaust duct.

SUMMARY

A thrust reverser for a gas turbine engine is disclosed, comprising a frame, a first reverser door pivotally mounted to the frame at a first pivot point, a second reverser door pivotally mounted to the frame at a second pivot point, a first nacelle defining a first trailing edge of the gas turbine engine coupled between the frame and the first reverser door, and a second nacelle defining a second trailing edge of the gas turbine engine coupled between the frame and the second reverser door, wherein, in response to the thrust reverser moving to a deployed position, the first nacelle and the second nacelle translate in an aft and radial outward direction relative to the gas turbine engine.

In various embodiments, the first reverser door is pivotally mounted to the frame and rotates about a first pivot point with respect to the frame, and the second reverser door is pivotally mounted to the frame and rotates about a second pivot point with respect to the frame.

In various embodiments, the first nacelle is pivotally coupled to the first reverser door whereby the first nacelle is configured to rotate about a third pivot point with respect to the first reverser door, and wherein the second nacelle is pivotally coupled to the second reverser door whereby the second nacelle is configured to rotate about a fourth pivot point with respect to the second reverser door.

In various embodiments, the thrust reverser further comprises a first pivoting member and a second pivoting member, wherein the first nacelle is pivotally mounted to the frame via the first pivoting member and the second nacelle is pivotally mounted to the frame via the second pivoting member.

In various embodiments, the first pivoting member includes a first link, a first end of the first link pivotally coupled to the frame whereby the first link is configured to rotate about a fifth pivot point with respect to the frame.

In various embodiments, the second pivoting member includes a second link, a first end of the second link pivotally coupled to the frame whereby the second link is configured to rotate about a sixth pivot point with respect to the frame.

In various embodiments, a second end of the first link is pivotally coupled to the first nacelle whereby the first link is configured to rotate about a seventh pivot point with respect to the first nacelle, and a second end of the second link pivotally coupled to the second nacelle whereby the second link is configured to rotate about a eighth pivot point with respect to the second nacelle.

In various embodiments, the thrust reverser further comprises a first pair of links, the first pair of links including the first link, and a second pair of links, the second pair of links including the second link.

In various embodiments, the thrust reverser defines a central axis.

In various embodiments, the thrust reverser further comprises a panel coupled to the frame and disposed between the first reverser door and the second reverser door, wherein the panel is disposed outward from the frame with respect to the central axis of the thrust reverser, and the panel is flush with the first reverser door and the second reverser door in response to the thrust reverser being in a stowed position.

A thrust reverser is disclosed, comprising a frame, a first reverser door pivotally mounted to the frame and configured to rotate about a first fixed pivot point with respect to the frame, a second reverser door pivotally mounted to the frame and configured to rotate about a second fixed pivot point with respect to the frame, a first nacelle defining a first trailing edge, the first nacelle pivotally coupled between the frame and the first reverser door, and a second nacelle defining a second trailing edge, the second nacelle pivotally coupled between the frame and the second reverser door, wherein, in response to the thrust reverser moving from a stowed position to a deployed position, the first reverser door rotates about the first fixed pivot point, the second reverser door rotates about the second fixed pivot point, the first nacelle translates in an aft and outward direction, and the second nacelle translates in the aft and outward direction.

In various embodiments, in response to the thrust reverser moving from the stowed position to the deployed position the first reverser door rotates about the first fixed pivot point in a first rotational direction, the second reverser door simultaneously rotates about the second fixed pivot point in a second rotational direction opposite the first rotational direction, and the first nacelle and the second nacelle simultaneously move aft and outward with respect to the frame.

In various embodiments, the first nacelle is pivotally coupled to the first reverser door whereby the first nacelle rotates with respect to the first reverser door about a first floating pivot point, and the second nacelle is pivotally coupled to the second reverser door whereby the second nacelle rotates with respect to the second reverser door about a second floating pivot point.

In various embodiments, the thrust reverser further comprises a first link, wherein a first end of the first link is pivotally coupled to the frame and configured to rotate about a third fixed pivot point with respect to the frame, and a second link, wherein a first end of the second link is pivotally coupled to the frame and configured to rotate about a fourth fixed pivot point with respect to the frame, wherein the first nacelle is pivotally coupled to a second end of the first link and configured to rotate with respect to the first link about a third floating pivot point, and wherein the second nacelle is pivotally coupled to a second end of the second link and configured to rotate with respect to the second link about a fourth floating pivot point.

In various embodiments, the first floating pivot point, the second floating pivot point, the third floating pivot point, and the fourth floating pivot point move in the aft and outward direction with respect to the frame in response to the thrust reverser moving from the stowed position to the deployed position, wherein the first floating pivot point and the third floating pivot point move in a first outward direction with respect to the frame in response to the thrust reverser moving from the stowed position to the deployed position, wherein the second floating pivot point and the fourth floating pivot point move in a second outward direction with respect to the frame in response to the thrust reverser moving from the stowed position to the deployed position.

In various embodiments, the first fixed pivot point is located aft of the third fixed pivot point.

In various embodiments, the first nacelle comprises a semi-annular structure and opposing beams extending from the semi-annular structure.

In various embodiments, the frame comprises an annular structure and opposing beams extending from the annular structure, wherein the first reverser door is mounted to the opposing beams.

In various embodiments, the thrust reverser further comprises a link pivotally coupled to the frame, wherein the link extends between the frame and the first nacelle, the link rotates with respect to the frame in response to the first nacelle moving aft and outward.

A method for manufacturing a thrust reverser is disclosed, comprising coupling a first reverser door to a frame, wherein the first reverser door pivots about a first fixed pivot point with respect to the frame, coupling a second reverser door to the frame, wherein the second reverser door pivots about a second fixed pivot point with respect to the frame, coupling a first link to the frame, wherein the first link pivots about a third fixed pivot point with respect to the frame, coupling a second link to the frame, wherein the second link pivots about a fourth fixed pivot point with respect to the frame, coupling a first nacelle to the first reverser door, wherein the first nacelle pivots about a first floating pivot point with respect to the first reverser door, coupling a second nacelle to the second reverser door, wherein the second nacelle pivots about a second floating pivot point with respect to the second reverser door, coupling the first nacelle to the first link, wherein the first nacelle pivots about a third floating pivot point with respect to the first link, and coupling the second nacelle to the second link, wherein the second nacelle pivots about a fourth floating pivot point with respect to the second link.

In various embodiments, the method further comprises coupling the first reverser door to a first actuator, and coupling the second reverser door to a second actuator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, a thrust reverser, as provided herein, may include nacelles that translate aft as reverser doors rotate from stowed positions to deployed positions. The pivot point about which the reverser doors rotate with respect to the frame may be moved further aft as a result of the translating nacelles. A thrust reverser, as provided herein, may be able to fit within shorter duct loft lines without sacrificing distance between a nozzle exit and the thrust reverser doors. A thrust reverser, as provided herein, may provide enhanced reverser efficiency, tailorable efflux, and capability of modifying performance parameters independently.

Figure 1:
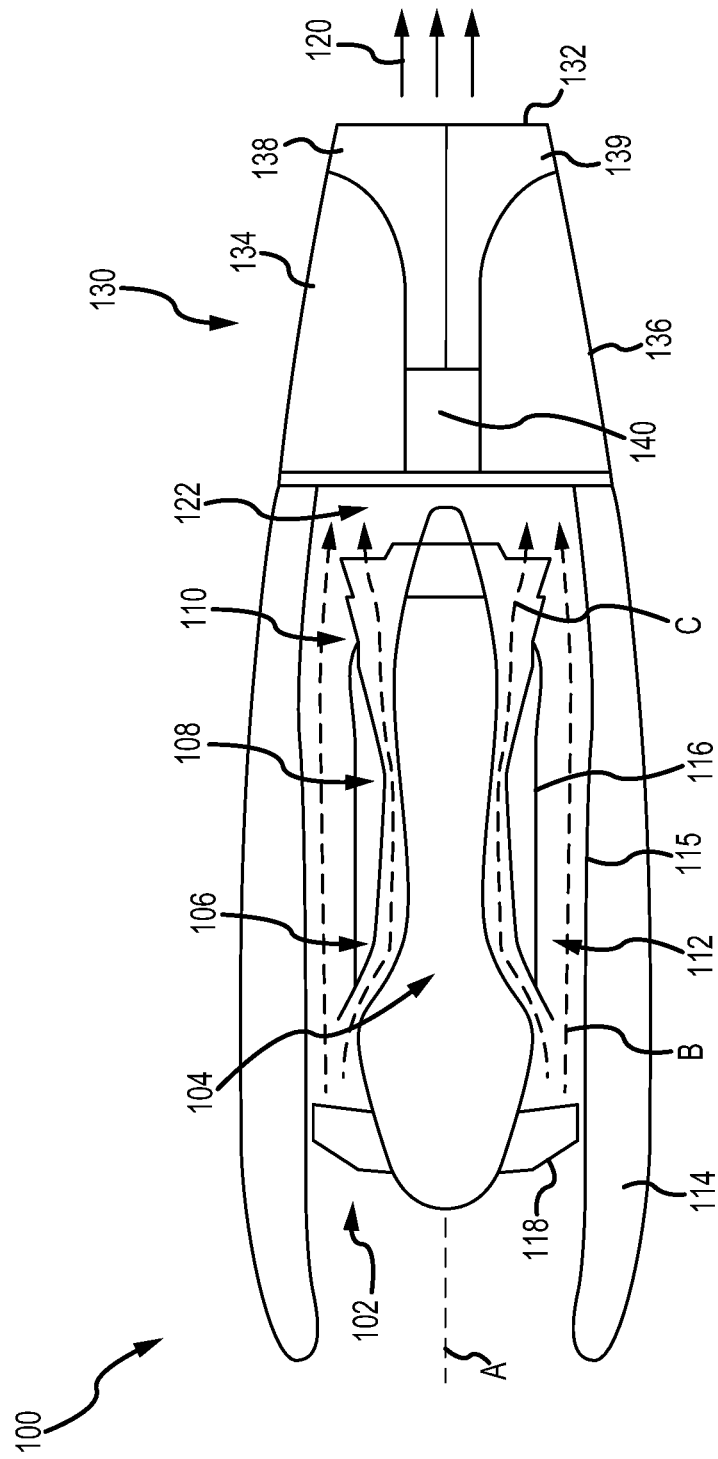
FIG. 1 provides a schematic view of a gas turbine engine, in accordance with various embodiments.

Referring now to the drawings, FIG. 1 schematically illustrates a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 1. The thrust reverser 130 further includes an upper reverser door 134, a lower reverser door 136, an upper nacelle 138, a lower nacelle 139, and a frame 140, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 2A:
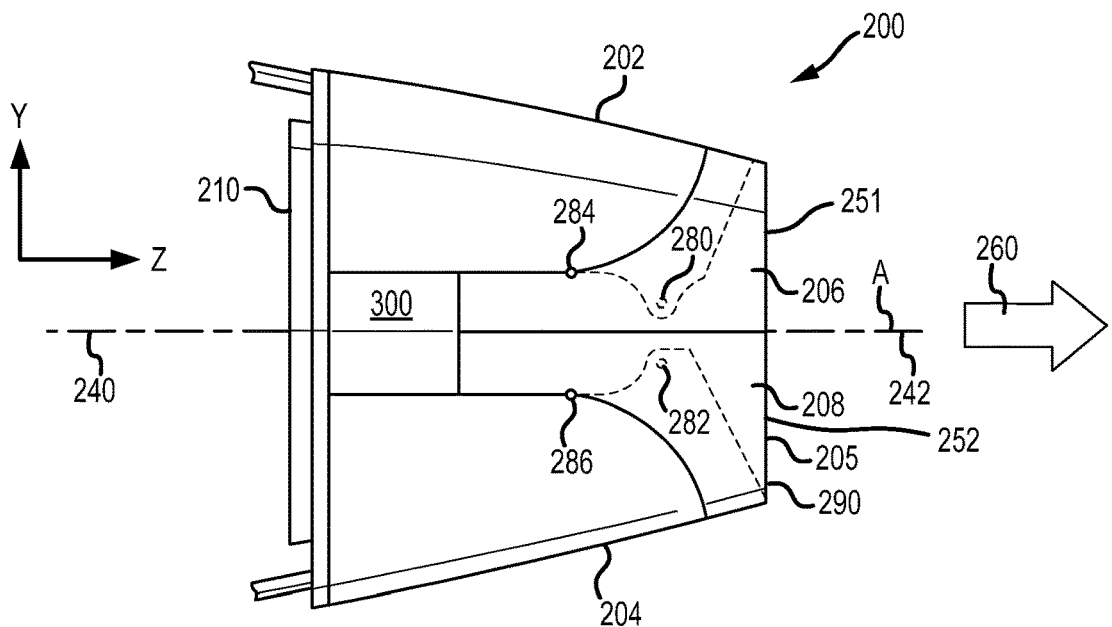
FIG. 2A, FIG. 2B, and FIG. 2C provide schematic views of a thrust reverser in a stowed position, a partially deployed position, and a fully deployed position, respectively, in accordance with various embodiments.
Figure 2B:
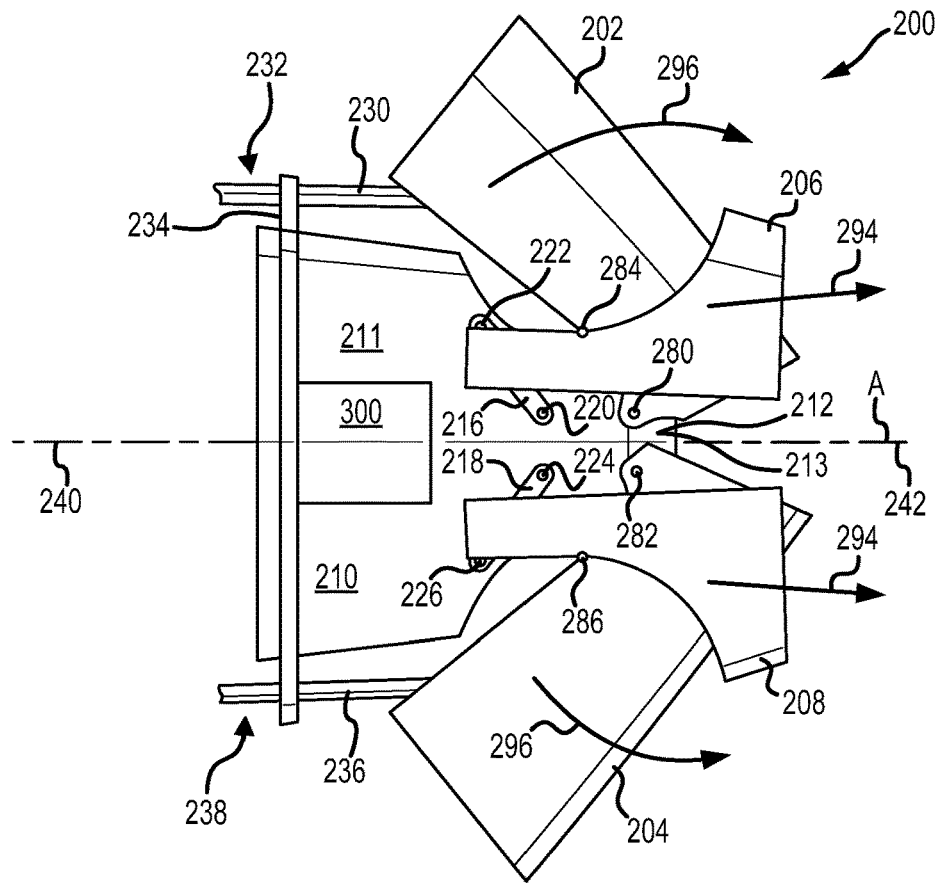
Figure 2C:
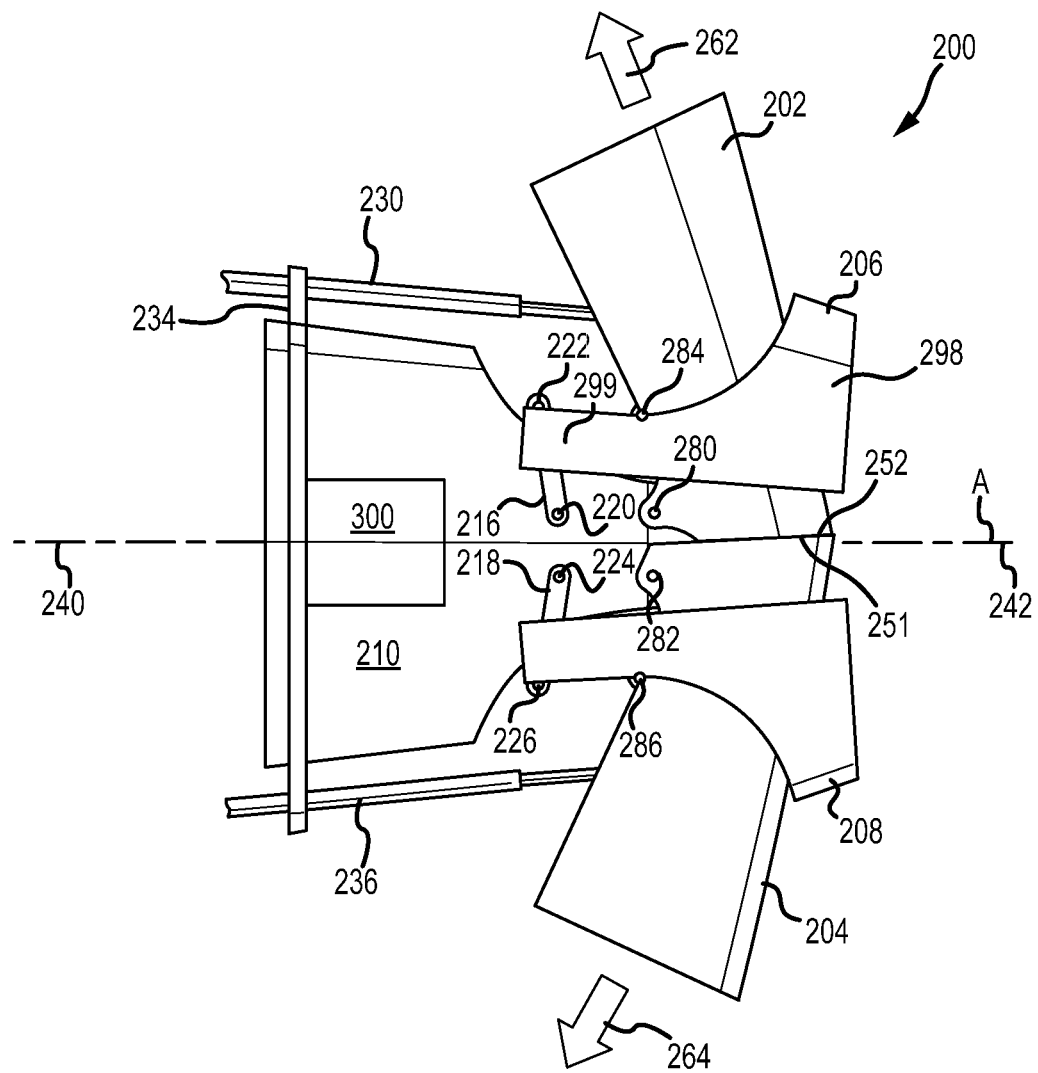

Referring now to FIG. 2A, FIG. 2B, and FIG. 2C, schematic side views of a thrust reverser 200 in a stowed position, partially deployed position, and a deployed position, respectively, are illustrated, in accordance with various embodiments. The thrust reverser 200 includes an upper reverser door 202, a lower reverser door 204, an upper nacelle 206 defining an upper trailing edge 251, a lower nacelle 208 defining a lower trailing edge 252, and a frame 210. In various embodiments, the upper nacelle 206 includes a semi-annular structure 298 with a pair of opposing side beams 299 extending from the semi-annular structure 298 (see FIG. 2C). Lower nacelle 208 may be similar to upper nacelle 206. In this regard, an exhaust duct 205 may be defined by a two part structure (i.e., upper nacelle 206 and lower nacelle 208) configured to split apart (e.g., upward and downward, respectively) and simultaneously translate aft in response to thrust reverser 200 moving to a deployed position.

In various embodiments, the frame 210 includes an annular structure 211 with a pair of opposing side beams 212 extending from the annular structure 211. The pair of opposing side beams 212 may include a port side beam 213 and a starboard side beam. The pair of opposing side beams 212 may provide a structural support for mounting related components and operating the thrust reverser 200 between deployed and retracted positions.

In various embodiments, a first port pivoting member (i.e., first pivoting member 216) is mounted to the port side beam 213 and a second port pivoting member) (i.e., pivoting member 218) is mounted to the port side beam 213. In various embodiments, a first starboard pivoting member is mounted to the starboard side beam and a second starboard pivoting member is mounted to the starboard side beam. In various embodiments, the first port pivoting member may be mounted to an upper portion of the port side beam 213 and the second port pivoting member may be mounted to a lower portion of the port side beam 213. In various embodiments, the starboard side pivot assembly and side beam configuration described herein are symmetrical with the port side pivot assembly and side beam configuration described herein. In this regard, although described herein with respect to the port side, it should be understood that the starboard side comprises a similar arrangement as the port side. In this regard, thrust reverser 200 may include a first pair of links (i.e., the first port pivoting member 216 and the first starboard pivoting member) and a second pair of links (i.e., the second port pivoting member 218 and the second starboard pivoting member).

In various embodiments, first pivoting member 216, characterized by a fixed pivot point (also referred to herein as a fifth pivot point or a third fixed pivot point) 220 and a floating pivot point (also referred to herein as a seventh pivot point or a third floating pivot point) 222, may include one or more components mounted to the opposing side beams 212 and may be configured to facilitate translation of the upper nacelle 206 between open or deployed and closed or stowed states within the thrust reverser 200. Furthermore, second pivoting member 218, characterized by a fixed pivot point (also referred to herein as a sixth pivot point or a fourth fixed pivot point) 224 and a floating pivot point (also referred to herein as an eighth pivot point or a fourth floating pivot point) 226, may include one or more components mounted to the opposing side beams 212 and may be configured to facilitate translation of the lower nacelle 208 between open or deployed and closed or stowed states within the thrust reverser 200. As used herein, the term "fixed pivot point" may refer to an axis of rotation of a pivoting member, wherein the position of the axis of rotation is fixed with respect to frame 210, independent of the rotational orientation of the pivoting member. As used herein, the term "floating pivot point" may refer to an axis of rotation of a pivoting member, wherein the position of the axis of rotation with respect to frame 210 varies dependent upon the rotational orientation of the pivoting member.

In various embodiments, first pivoting member 216 may comprise a first end pivotally coupled to side beam 213 of frame 210 and a second end pivotally coupled to upper nacelle 206. First pivoting member 216 may rotate about fixed pivot point 220. First pivoting member 216 may rotate about floating pivot point 222. Upper nacelle 206 may be pivotally coupled to first pivoting member 216 whereby upper nacelle 206 may rotate about floating pivot point 222. In various embodiments, second pivoting member 218 may comprise a first end pivotally coupled to side beam 213 of frame 210 and a second end pivotally coupled to lower nacelle 208. Second pivoting member 218 may rotate about fixed pivot point 224. Second pivoting member 218 may rotate about floating pivot point 226. Lower nacelle 208 may be pivotally coupled to second pivoting member 218 whereby lower nacelle 208 may rotate about floating pivot point 226.

In various embodiments, first pivoting member 216 and/or second pivoting member 218 may comprise a link (also referred to as a crank arm or a swing arm). First pivoting member 216 and/or second pivoting member 218 may be made from any suitable material, such as a metal or metal alloy, among others.

In various embodiments, upper reverser door 202 may be pivotally coupled to port side beam 213 of frame 210 at fixed pivot point (also referred to herein as a first pivot point or a first fixed pivot point) 280. Similarly, lower reverser door 204 may be pivotally coupled to port side beam 213 of frame 210 at fixed pivot point (also referred to herein as a second pivot point or a second fixed pivot point) 282. Upper reverser door 202 may be pivotally coupled to upper nacelle 206 at floating pivot point (also referred to herein as a third pivot point or a first floating pivot point) 284. Similarly, lower reverser door 204 may be pivotally coupled to lower nacelle 208 at floating pivot point (also referred to herein as a fourth pivot point or a second floating pivot point) 286.

In various embodiments, a first actuator 230 may have a first end 232 connected to an attachment flange 234 and a second end connected to an inner surface of the upper reverser door 202. Similarly, a second actuator 236 may have a first end 238 connected to the attachment flange 234 and a second end connected to an inner surface of the lower reverser door 204.

In various embodiments, first actuator 230 may extend to rotate upper reverser door 202 about fixed pivot point 280 between a stowed position (see FIG. 2A) and a deployed position (see FIG. 2C). Similarly, second actuator 236 may extend to rotate lower reverser door 204 about fixed pivot point 282 between the stowed position and the deployed position. With particular focus on FIG. 2B, as upper reverser door 202 and lower reverser door 204 move between the stowed position and the deployed position, upper reverser door 202 and lower reverser door 204 may simultaneously rotate, illustrated by arrows 296, about fixed pivot point 280 and fixed pivot point 282, respectively. Upper reverser door 202 may rotate in a first rotational direction about fixed pivot point 280 and lower reverser door 204 may rotate in a second rotational direction about fixed pivot point 282, opposite the first rotational direction.

Extension of actuator 230 may cause first pivoting member 216 to rotate about fixed pivot point 220, causing floating pivot point 222 to move in the aft direction (i.e., the positive Z-direction). Extension of actuator 230 may cause first pivoting member 216 to rotate about fixed pivot point 220, causing floating pivot point 222 to move in a first radially outward direction (i.e., the positive Y-direction). Stated differently, extension of actuator 230 may cause upper reverser door 202 to rotate about fixed pivot point 280. Rotation of upper reverser door 202 may drive upper nacelle 206 in the aft and outward directions, driving first pivoting member 216 to rotate about fixed pivot point 220. In this regard, a load path may be formed between actuator 230 and upper reverser door 202, between upper reverser door 202 and upper nacelle 206 at floating pivot point 284, between upper nacelle 206 and first pivoting member 216 at floating pivot point 222, between first pivoting member 216 and frame 210 at fixed pivot point 220, and between frame 210 and actuator 230 at attachment flange 234.

Extension of actuator 236 may cause second pivoting member 218 to rotate about fixed pivot point 224, causing floating pivot point 226 to move in the aft direction (i.e., the positive Z-direction). Extension of actuator 236 may cause second pivoting member 218 to rotate about fixed pivot point 224, causing floating pivot point 226 to move in a second radially outward direction (i.e., the negative Y-direction). Stated differently, extension of actuator 236 may cause lower reverser door 204 to rotate about fixed pivot point 282. Rotation of lower reverser door 204 may drive lower nacelle 208 in the aft and outward directions, driving second pivoting member 218 to rotate about fixed pivot point 224. In this regard, a load path may be formed between actuator 236 and lower reverser door 204, between lower reverser door 204 and lower nacelle 208 at floating pivot point 286, between lower nacelle 208 and second pivoting member 218 at floating pivot point 226, between second pivoting member 218 and frame 210 at fixed pivot point 224, and between frame 210 and actuator 236 at attachment flange 234.

Upper nacelle 206 may translate aft and outward, illustrated by arrows 294, in response to upper reverser door 202 rotating about fixed pivot point 280 to allow upper reverser door 202 to move to the deployed position without physically clashing with upper nacelle 206. Similarly, lower nacelle 208 may translate aft and outward, illustrated by arrows 294, in response to lower reverser door 204 rotating about fixed pivot point 282 to allow lower reverser door 204 to move to the deployed position without physically clashing with lower nacelle 208. By configuring upper nacelle 206 lower nacelle 208 to translate aft in response to upper reverser door 202 and lower reverser door 204 moving to their deployed positions, fixed pivot point 280 and fixed pivot point 282 may be located further aft than they would otherwise be if upper nacelle 206 and lower nacelle 208 were fixed. Moving from the deployed position to the stowed position may be the reverse operation as moving from the stowed position to the deployed position.

Still referring to FIGS. 2A, 2B, and 2C, in response to the thrust reverser 200 assuming the closed or stowed position, e.g., during flight, the upper reverser door 202 and the lower reverser door 204 are rotated to their closed positions (see FIG. 2A). The outer surfaces of the upper reverser door 202 and the lower reverser door 204 blend with the outer surface of the nacelle, forming a smooth aerodynamic shape of the gas turbine engine. In the same stowed position, the aft edge of upper reverser door 202 may be covered by upper nacelle 206 and the aft edge of lower reverser door 204 may be covered by lower nacelle 208. In the same stowed configuration, a mixed gas stream 260 exits the exhaust duct 205 and is generally unaffected by the thrust reverser 200 or its componentry, as the inner surfaces of the upper reverser door 202 and the lower reverser door 204 are blended with the interior surface of the exhaust duct 205 to provide a generally smooth and annular exhaust flow path from downstream of the core engine exhaust to a downstream exit plane or aft end 290 of the thrust reverser 200. While in the stowed position, the mixed gas stream 260 flows out the exhaust duct 205, providing forward thrust necessary to propel the aircraft. When the thrust reverser 200 assumes the open or deployed position, e.g., upon landing, the upper reverser door 202 and the lower reverser door 204 are rotated to their open positions (see FIG. 2C). The mixed gas stream 260 is diverted from the exit of the exhaust duct 205 to form a first stream 262, following an inner surface of the upper reverser door 202 and a second stream 264, following an inner surface of the lower reverser door 204. Both the first stream 262 and the second stream 264 have forward vector components of thrust, which provide the reverse thrust acting on the aircraft.

A central axis A is illustrated extending through the thrust reverser 200. The central axis A may define a fore end or fore direction 240 of the thrust reverser 200 and an aft end or aft direction 242 of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, the port side beam 213 may be considered positioned to the port or left side of the central axis A (looking in the fore direction 240) while the starboard side beam may be considered positioned to the right or starboard side of the central axis A (looking in the fore direction 240). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A. As used herein, a first component positioned opposite a second component does not imply the second component is a mirror image of the first component or the second component is positioned symmetrically opposite to the first component, though the disclosure contemplates such mirror image and symmetric configurations and positioning.

Still referring to FIGS. 2A, 2B, and 2C, when the thrust reverser 200 assumes the deployed state, as shown in FIG. 2C, trailing edge 251 of the upper reverser door 202 may contact trailing edge 252 of lower reverser door 204. Trailing edge 251 and trailing edge 252 may seal to prevent mixed gas stream 260 from flowing between upper reverser door 202 and lower reverser door 204.

Figure 2D:
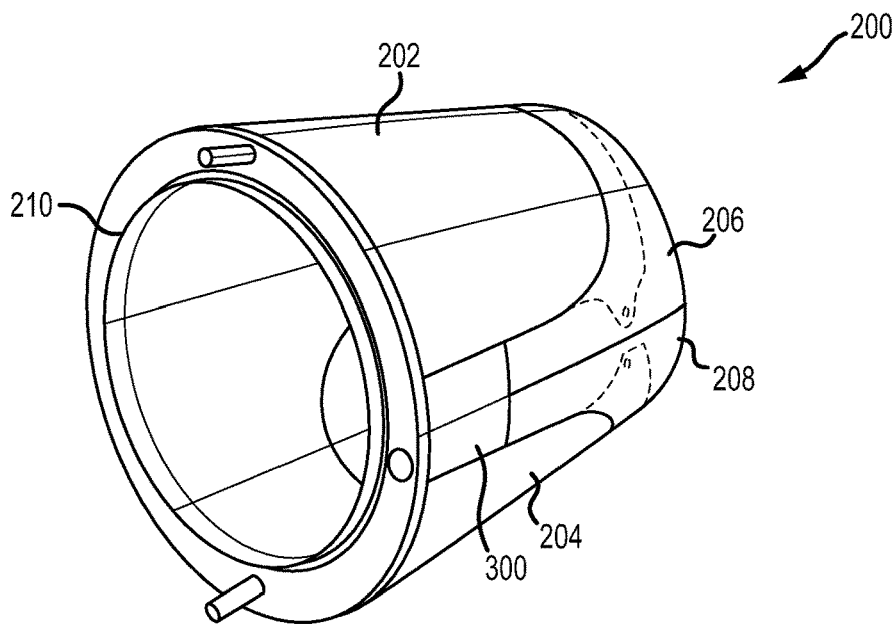
FIG. 2D and FIG. 2E provide schematic perspective views of the thrust reverser depicted in FIG. 2A and FIG. 2C, in a stowed position and a deployed position, respectively, in accordance with various embodiments.
Figure 2E:
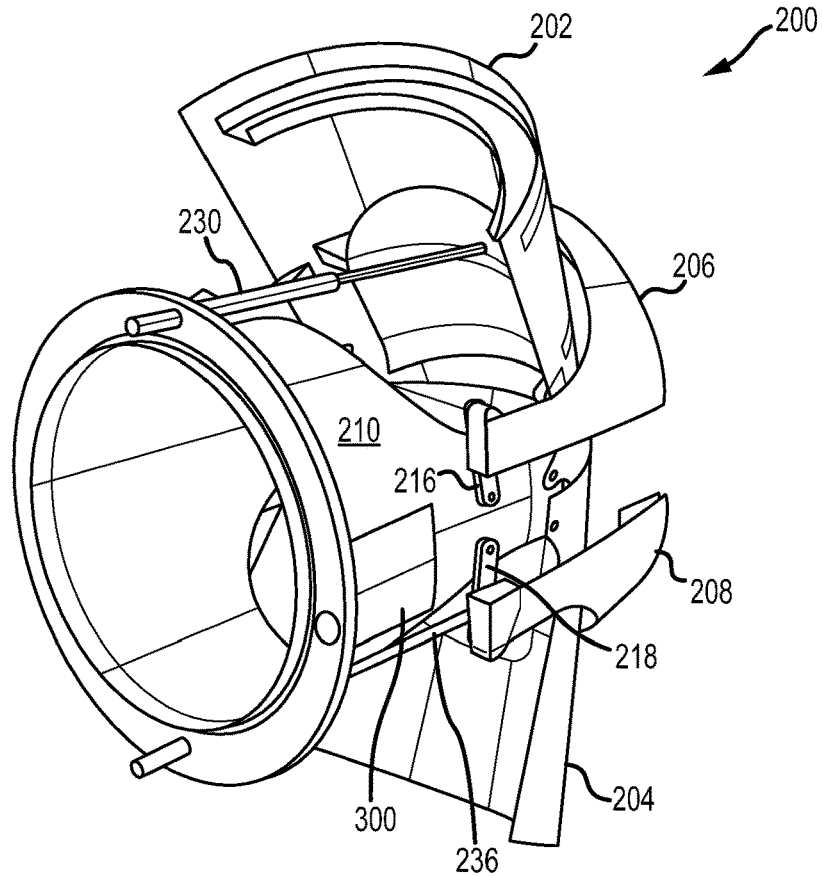

With reference to FIG. 2D and FIG. 2E, thrust reverser 200 is illustrated in the stowed position and the deployed position, respectively. Thrust reverser 200 may further include a panel 300 coupled to frame 210. Panel 300 may be positioned between upper reverser door 202 and lower reverser door 204. Panel 300 may be flush with upper reverser door 202 and lower reverser door 204 in response to thrust reverser 200 being in the stowed position (see FIG. 2D). Panel 300 may comprise a curved sheet of material. Panel 300 may be made from a metal, a metal alloy, or a composite material, among others. Panel 300 may be disposed outward from frame 210 with respect to central axis A.

Figure 3A:
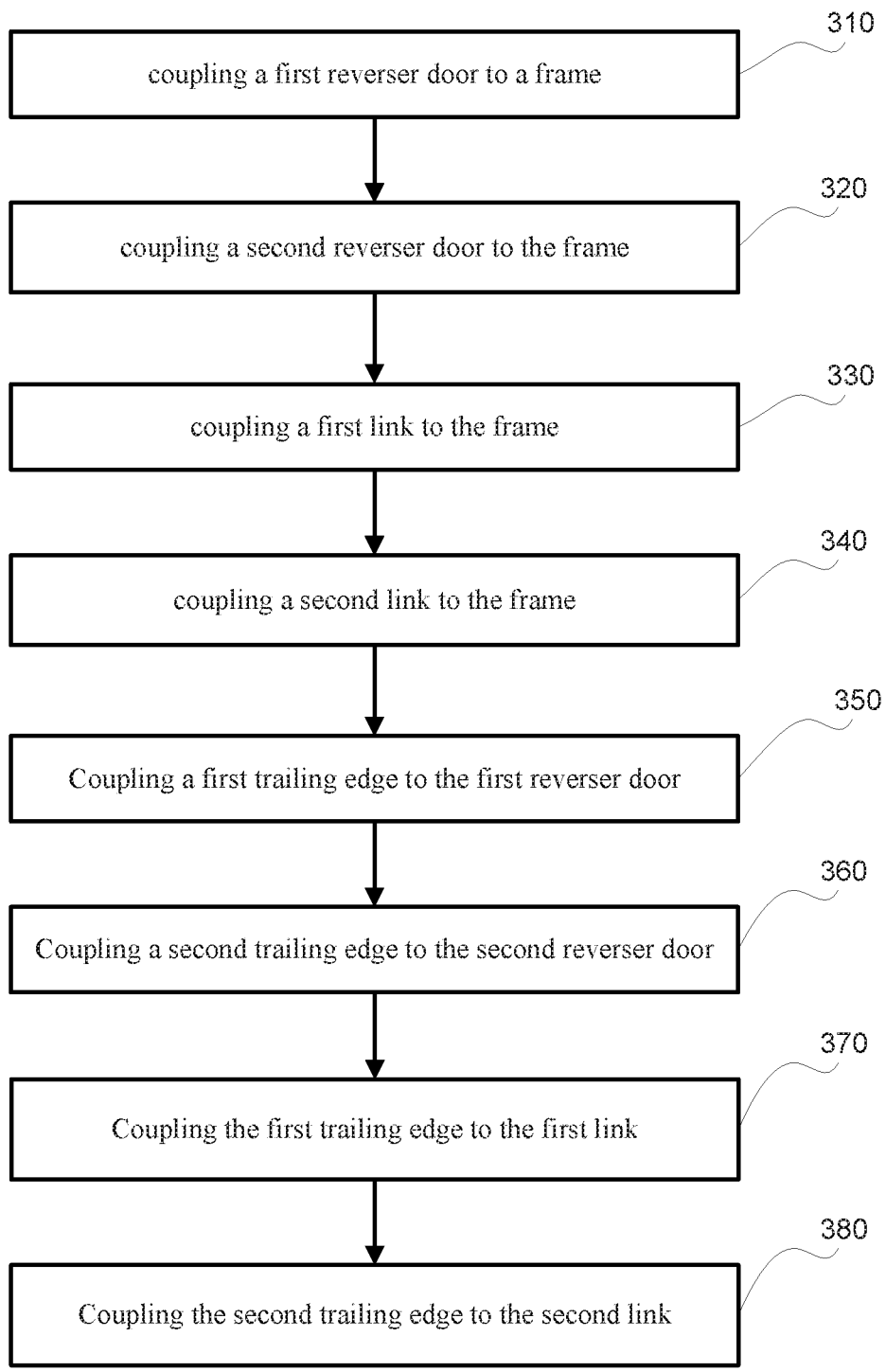
FIG. 3A and FIG. 3B provide flow charts illustrating a method of manufacturing a thrust reverser, in accordance with various embodiments.
Figure 3B:
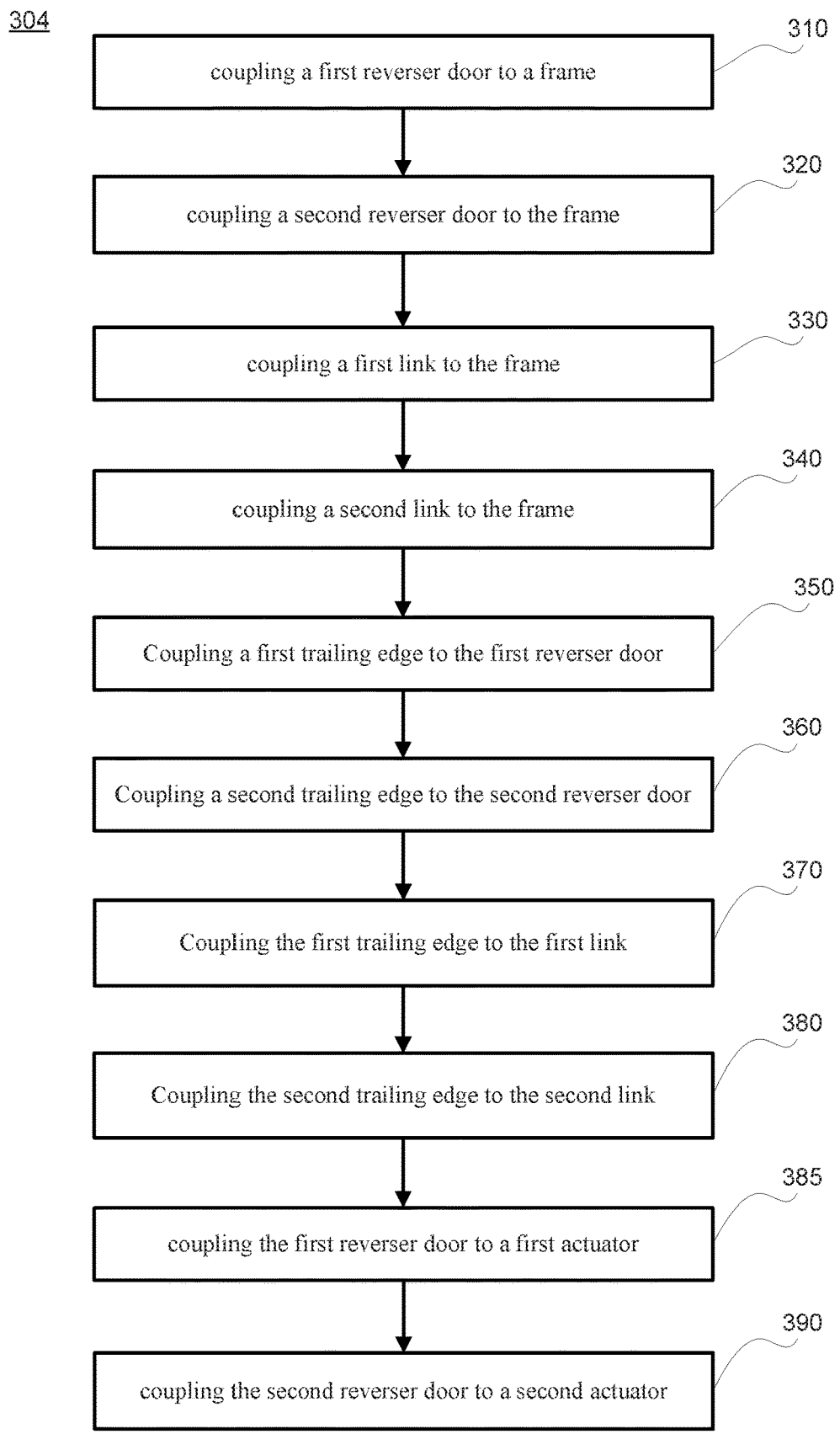

With reference to FIG. 3A, a method 304 for manufacturing a thrust reverser is illustrated, in accordance with various embodiments. Method 304 includes coupling a first reverser door to a frame (step 310). Method 304 includes coupling a second reverser door to the frame (step 320). Method 304 includes coupling a first link to a frame (step 330). Method 304 includes coupling a second link to the frame (step 340). Method 304 includes coupling a first trailing edge to the first reverser door (step 350). Method 304 includes coupling a second trailing edge to the second reverser door (step 360). Method 304 includes coupling the first trailing edge to the first link (step 370). Method 304 includes coupling the second trailing edge to the second link (step 380). With reference to FIG. 3B, method 304 may further include coupling the first reverser door to a first actuator (step 385). Method 304 may further include coupling the second reverser door to a second actuator (step 390).

With combined reference to FIG. 3B and FIG. 2C, step 310 may include coupling upper reverser door 202 to frame 210 at pivot point 280. Step 320 may include coupling lower reverser door 204 to frame 210 at pivot point 282. Step 330 may include coupling pivoting member 216 to frame 210, wherein pivoting member 216 pivots about fixed pivot point 220 with respect to frame 210. Step 340 may include coupling pivoting member 218 to frame 210, wherein pivoting member 218 pivots about fixed pivot point 224 with respect to frame 210. Step 350 may include coupling upper nacelle 206 to upper reverser door 202 at pivot point 284. Step 360 may include coupling lower nacelle 208 to lower reverser door 204 at pivot point 286. Step 370 may include coupling upper nacelle 206 to pivoting member 216 at pivot point 222. Step 380 may include coupling lower nacelle 208 to pivoting member 218 at pivot point 226. Step 385 may include coupling upper reverser door 202 to actuator 230. Step 390 may include coupling lower reverser door 204 to actuator 236.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A thrust reverser for a gas turbine engine, comprising:
a frame;
a first reverser door pivotally mounted to the frame at a first pivot point;
a second reverser door pivotally mounted to the frame at a second pivot point;
a first nacelle defining a first trailing edge of the gas turbine engine coupled between the frame and the first reverser door; and
a second nacelle defining a second trailing edge of the gas turbine engine coupled between the frame and the second reverser door;
wherein, in response to the thrust reverser moving to a deployed position, the first nacelle and the second nacelle translate in an aft and radial outward direction relative to the gas turbine engine.

2. The thrust reverser of claim 1, wherein the first reverser door is pivotally mounted to the frame and rotates about the first pivot point with respect to the frame; and the second reverser door is pivotally mounted to the frame and rotates about the second pivot point with respect to the frame.

3. The thrust reverser of claim 2, wherein the first nacelle is pivotally coupled to the first reverser door whereby the first nacelle is configured to rotate about a third pivot point with respect to the first reverser door; and
wherein the second nacelle is pivotally coupled to the second reverser door whereby the second nacelle is configured to rotate about a fourth pivot point with respect to the second reverser door.

4. The thrust reverser of claim 3, further comprising:
a first pivoting member; and
a second pivoting member, wherein the first nacelle is pivotally mounted to the frame via the first pivoting member and the second nacelle is pivotally mounted to the frame via the second pivoting member.

5. The thrust reverser of claim 4, wherein the first pivoting member includes a first link, a first end of the first link pivotally coupled to the frame whereby the first link is configured to rotate about a fifth pivot point with respect to the frame.

6. The thrust reverser of claim 5, wherein the second pivoting member includes a second link, a first end of the second link pivotally coupled to the frame whereby the second link is configured to rotate about a sixth pivot point with respect to the frame.

7. The thrust reverser of claim 6, wherein a second end of the first link is pivotally coupled to the first nacelle whereby the first link is configured to rotate about a seventh pivot point with respect to the first nacelle; and
a second end of the second link pivotally coupled to the second nacelle whereby the second link is configured to rotate about a eighth pivot point with respect to the second nacelle.

8. The thrust reverser of claim 7, further comprising:
a first pair of links, the first pair of links including the first link; and
a second pair of links, the second pair of links including the second link.

9. The thrust reverser of claim 1, wherein the thrust reverser defines a central axis; and
further comprising a panel coupled to the frame and disposed between the first reverser door and the second reverser door, wherein the panel is disposed outward from the frame with respect to the central axis of the thrust reverser, and the panel is flush with the first reverser door and the second reverser door in response to the thrust reverser being in a stowed position.

10. A thrust reverser, comprising:
a frame;
a first reverser door pivotally mounted to the frame and configured to rotate about a first fixed pivot point with respect to the frame;
a second reverser door pivotally mounted to the frame and configured to rotate about a second fixed pivot point with respect to the frame;
a first nacelle defining a first trailing edge, the first nacelle pivotally coupled between the frame and the first reverser door; and
a second nacelle defining a second trailing edge, the second nacelle pivotally coupled between the frame and the second reverser door;
wherein, in response to the thrust reverser moving from a stowed position to a deployed position, the first reverser door rotates about the first fixed pivot point, the second reverser door rotates about the second fixed pivot point, the first nacelle translates in an aft and outward direction, and the second nacelle translates in the aft and outward direction.

11. The thrust reverser of claim 10, wherein, in response to the thrust reverser moving from the stowed position to the deployed position the first reverser door rotates about the first fixed pivot point in a first rotational direction, the second reverser door simultaneously rotates about the second fixed pivot point in a second rotational direction opposite the first rotational direction, and the first nacelle and the second nacelle simultaneously move aft and outward with respect to the frame.

12. The thrust reverser of claim 11, wherein the first nacelle is pivotally coupled to the first reverser door whereby the first nacelle rotates with respect to the first reverser door about a first floating pivot point; and
the second nacelle is pivotally coupled to the second reverser door whereby the second nacelle rotates with respect to the second reverser door about a second floating pivot point.

13. The thrust reverser of claim 12, further comprising:
a first link, wherein a first end of the first link is pivotally coupled to the frame and configured to rotate about a third fixed pivot point with respect to the frame; and
a second link, wherein a first end of the second link is pivotally coupled to the frame and configured to rotate about a fourth fixed pivot point with respect to the frame;

wherein the first nacelle is pivotally coupled to a second end of the first link and configured to rotate with respect to the first link about a third floating pivot point; and wherein the second nacelle is pivotally coupled to a second end of the second link and configured to rotate with respect to the second link about a fourth floating pivot point.

14. The thrust reverser of claim 13, wherein the first floating pivot point, the second floating pivot point, the third floating pivot point, and the fourth floating pivot point move in the aft and outward direction with respect to the frame in response to the thrust reverser moving from the stowed position to the deployed position, wherein the first floating pivot point and the third floating pivot point move in a first outward direction with respect to the frame in response to the thrust reverser moving from the stowed position to the deployed position, wherein the second floating pivot point and the fourth floating pivot point move in a second outward direction with respect to the frame in response to the thrust reverser moving from the stowed position to the deployed position.

15. The thrust reverser of claim 14, wherein the first fixed pivot point is located aft of the third fixed pivot point.

16. The thrust reverser of claim 10, wherein the first nacelle comprises a semi-annular structure and opposing beams extending from the semi-annular structure.

17. The thrust reverser of claim 10, wherein the frame comprises an annular structure and opposing beams extending from the annular structure, wherein the first reverser door is mounted to the opposing beams.

18. The thrust reverser of claim 10, further comprising a link pivotally coupled to the frame, wherein the link extends between the frame and the first nacelle, the link rotates with respect to the frame in response to the first nacelle moving aft and outward.

* * * * *